United States Patent
Zheng et al.

(10) Patent No.: US 11,414,122 B2
(45) Date of Patent: Aug. 16, 2022

(54) HANDWHEEL-ROADWHEEL RESYNCHRONIZATION IN STEER-BY-WIRE SYSTEMS

(71) Applicant: STEERING SOLUTIONS IP HOLDING CORPORATION, Saginaw, MI (US)

(72) Inventors: Kai Zheng, Midland, MI (US); Steven Klein, Munger, MI (US); Mariam Swetha George, Midland, MI (US); Scott T. Sanford, Swartz Creek, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 764 days.

(21) Appl. No.: 16/290,342

(22) Filed: Mar. 1, 2019

(65) Prior Publication Data
US 2020/0277004 A1 Sep. 3, 2020

(51) Int. Cl.
*B62D 6/00* (2006.01)
*B62D 5/00* (2006.01)
(Continued)

(52) U.S. Cl.
CPC .......... *B62D 5/0463* (2013.01); *B62D 1/166* (2013.01); *B62D 3/12* (2013.01); *B62D 5/005* (2013.01);
(Continued)

(58) Field of Classification Search
None
See application file for complete search history.

(56) References Cited

U.S. PATENT DOCUMENTS

| | | | |
|---|---|---|---|
| 6,922,620 B2 * | 7/2005 | Augustine | B60R 25/02 180/411 |
| 2015/0291210 A1 * | 10/2015 | Kageyama | B62D 5/04 701/41 |

(Continued)

FOREIGN PATENT DOCUMENTS

| | | |
|---|---|---|
| DE | 10302559 A1 | 9/2004 |
| DE | 102006023562 B4 | 10/2009 |

(Continued)

OTHER PUBLICATIONS

First Chinese Office Action with Search Report dated Dec. 16, 2021 for Chinese Application No. 202010136398.7, 7 pages.

(Continued)

*Primary Examiner* — Adam D Tissot
*Assistant Examiner* — Laura E Linhardt
(74) *Attorney, Agent, or Firm* — Dickinson Wright PLLC

(57) ABSTRACT

According to one or more embodiments, a steer by wire steering system includes a handwheel actuator, a roadwheel actuator, and a resynchronization module to dynamically adjust handwheel position that is used for rack position reference calculation. The dynamic adjustment includes determining a desynchronization amount based on a difference in an actual handwheel position and a synchronized handwheel position. The dynamic adjustment further includes computing a handwheel adjustment using the desynchronization amount, a vehicle speed, and a handwheel speed. The dynamic adjustment further includes computing an adjusted handwheel position based on the handwheel adjustment and the actual handwheel position. The dynamic adjustment further includes updating the reference rack position based on the adjusted handwheel position. The dynamic adjustment is continuously repeated until the handwheel adjustment is substantially equal to zero.

20 Claims, 8 Drawing Sheets

(51) Int. Cl.
  *B62D 5/04* (2006.01)
  *G06F 7/00* (2006.01)
  *B62D 3/12* (2006.01)
  *B62D 6/08* (2006.01)
  *B62D 1/16* (2006.01)

(52) U.S. Cl.
  CPC ............ *B62D 5/0409* (2013.01); *B62D 6/008* (2013.01); *B62D 6/08* (2013.01)

(56) References Cited

U.S. PATENT DOCUMENTS

| | | | | |
|---|---|---|---|---|
| 2018/0346018 | A1* | 12/2018 | Kataoka | B62D 6/00 |
| 2020/0406964 | A1* | 12/2020 | Hulten | B62D 6/008 |
| 2021/0284230 | A1 | 9/2021 | Dobberphul et al. | |

FOREIGN PATENT DOCUMENTS

| | | |
|---|---|---|
| DE | 102012022900 A1 | 5/2014 |
| EP | 1308367 A2 | 5/2003 |
| WO | 2018/157989 A1 | 9/2018 |

OTHER PUBLICATIONS

German Examination Request with English translation for German Application No. 10 2020 104 463.1 dated Feb. 18, 2022, 14 pages.

\* cited by examiner

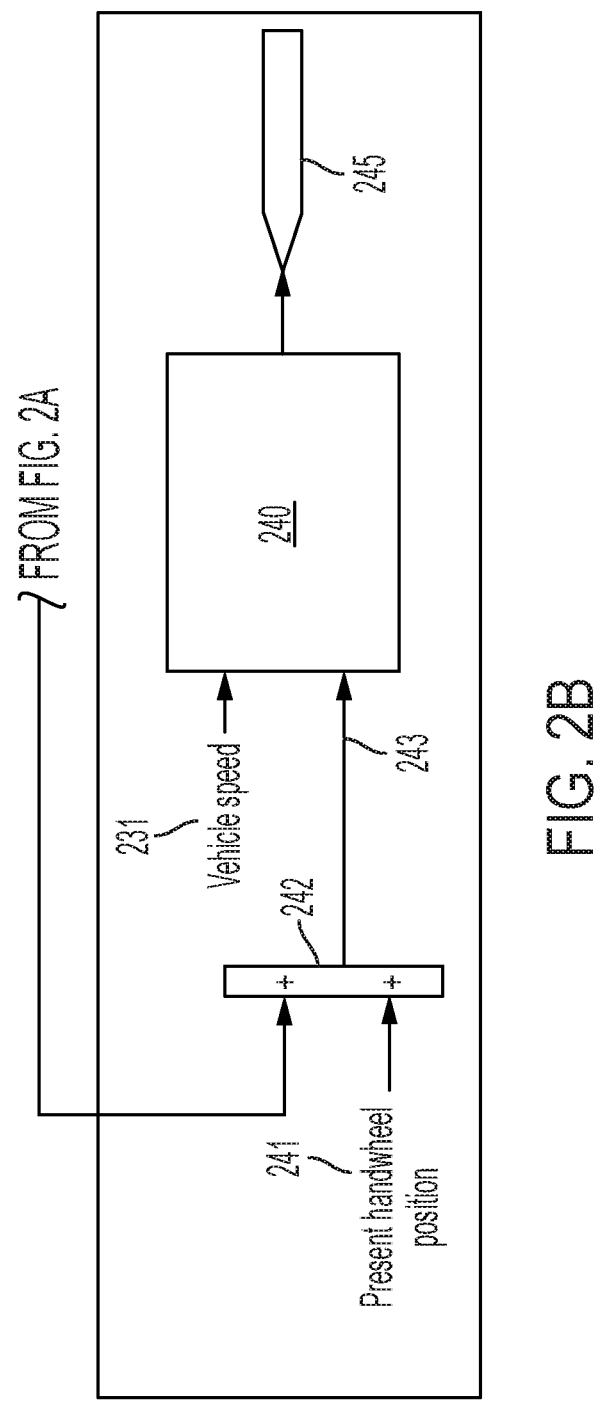

HANDWHEEL-ROADWHEEL RESYNCHRONIZATION IN STEER-BY-WIRE SYSTEMS

BACKGROUND

An electric power steering (EPS) typically includes components such as steering wheel, column, rack-pinion gear, electric motor actuator etc. The EPS helps the operator to steer a vehicle by providing necessary torque assist. The assist torque is based on operator's applied torque. In a steady-state sense, the operator torque and assist torque counter the rack force generated because of tire-road interaction.

A typical Steer by wire (SbW) system includes a roadwheel actuator (RWA) unit and handwheel (or steering wheel) actuator (HWA) unit. Unlike the EPS, the two units in the SbW are mechanically disconnected and communicate through controlled area network (CAN) interface (or other similar digital communication protocols). The HWA unit receives a rack force signal from the RWA unit to generate an appropriate torque feel for the operator. Alternatively, the handwheel angle and vehicle speed can also be used to generate desired torque feel to the operator. The angle from HWA unit is sent to the RWA unit which performs position control to control rack travel.

SUMMARY

According to one or more embodiments, a steer by wire steering system includes a handwheel actuator, a roadwheel actuator, and a resynchronization module to dynamically adjust handwheel position that is used for rack position reference calculation. The dynamic adjustment includes determining a desynchronization amount based on a difference in an actual handwheel position and a synchronized handwheel position. The dynamic adjustment further includes computing a handwheel adjustment using the desynchronization amount, a vehicle speed, and a handwheel speed. The dynamic adjustment further includes computing an adjusted handwheel position based on the handwheel adjustment and the actual handwheel position. The dynamic adjustment further includes updating the reference rack position based on the adjusted handwheel position. The dynamic adjustment is continuously repeated until the handwheel adjustment is substantially equal to zero.

According to one or more embodiments, a method for synchronizing a handwheel and a roadwheel in a steer by wire steering system includes a dynamic adjustment of handwheel position that is used for rack position reference calculation. The resynchronization includes a dynamic adjustment of handwheel position that is used for rack position reference calculation. The dynamic adjustment includes determining a desynchronization amount based on a difference in an actual handwheel position and a synchronized handwheel position. The dynamic adjustment further includes computing a handwheel adjustment using the desynchronization amount, a vehicle speed, and a handwheel speed. The dynamic adjustment further includes computing an adjusted handwheel position based on the handwheel adjustment and the actual handwheel position. The dynamic adjustment further includes updating the reference rack position based on the adjusted handwheel position. The dynamic adjustment is continuously repeated until the handwheel adjustment is substantially equal to zero.

According to one or more embodiments, a computer program product includes a memory storage device having computer executable instructions stored therein, the computer executable instructions when executed by a processing unit cause the processing unit to perform resynchronization of a handwheel and a roadwheel in a steer by wire steering system. The resynchronization includes a dynamic adjustment of handwheel position that is used for rack position reference calculation. The dynamic adjustment includes determining a desynchronization amount based on a difference in an actual handwheel position and a synchronized handwheel position. The dynamic adjustment further includes computing a handwheel adjustment using the desynchronization amount, a vehicle speed, and a handwheel speed. The dynamic adjustment further includes computing an adjusted handwheel position based on the handwheel adjustment and the actual handwheel position. The dynamic adjustment further includes updating the reference rack position based on the adjusted handwheel position. The dynamic adjustment is continuously repeated until the handwheel adjustment is substantially equal to zero.

These and other advantages and features will become more apparent from the following description taken in conjunction with the drawings.

BRIEF DESCRIPTION OF THE DRAWINGS

FIGS. 2A and 2B depict a block diagram of the resynchronization module according to one or more embodiments;

DETAILED DESCRIPTION

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The present application is generally related to steering systems, and particularly describes one or more techniques for providing operator notification using handwheel actuators in steer by wire type steering systems.

The steering system helps the operator to steer a vehicle by providing necessary torque assist. Today, a modern steering system typically includes components such as steering wheel, column, rack-pinion gear, electric motor actuator etc. The assist torque is based on operator's applied torque. In a steady-state sense, the operator torque and assist torque counter the rack force generated because of tire-road interaction.

Figure 1:
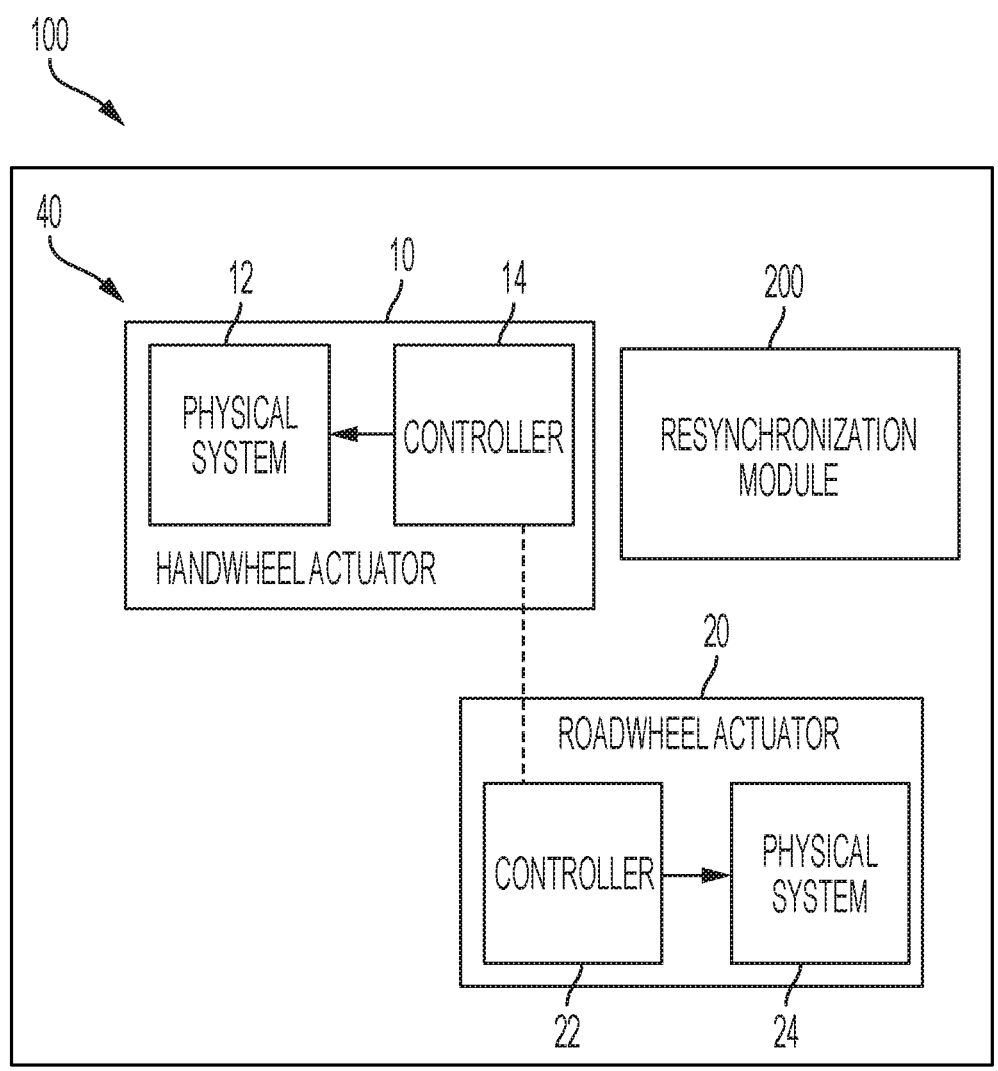
FIG. 1 is an exemplary embodiment of a steer by wire steering system according to one or more embodiments.

Referring now to the Figures, where the invention will be described with reference to specific embodiments, without limiting same, a steer by wire steering (SbW) system 40 in a vehicle 100 is depicted in FIG. 1. It will be appreciated that the SbW system 40 shown and described can be used in an autonomous or semi-autonomous vehicle or in a more conventional vehicle. The SbW system 40 includes a handwheel actuator (HWA) 10 and a roadwheel actuator (RWA) 20.

The HWA 10 includes one or more mechanical components 12, such as a handwheel (steering wheel), a steering column, a motor/inverter attached to the steering column either through a gear mechanism or a direct drive system. The HWA 10 further includes a microcontroller 14 that controls the operation of the mechanical components 12. The microcontroller 14 receives and/or generates torque via the one or more mechanical components 12.

The RWA includes one or more mechanical components 24, such as a steering rack and/or pinion coupled to a motor/inverter through a ball-nut/ball-screw (gear) arrangement, and the rack is connected to the vehicle roadwheels/tires through tie-rods. The RWA 20 includes a microcontroller 24 that controls the operation of the mechanical components 24. The microcontroller 22 receives and/or generates torque via the one or more mechanical components 24.

The microcontrollers 12 and 22 are coupled through electrical connections that allow signals to be transmitted/received. As referred to herein, a controller can include a combination of the HWA controller 12 and the RWA controller 22, or any one of the specific microcontrollers.

In one or more examples, the controllers 12 and 22 in SbW system 40 communicate with each other through CAN interface (or other similar digital communication protocols). Guidance of the vehicle 100 that is fitted with the SbW system 40 is performed by use of the steering gear, with an input shaft that is rotated by the RWA 20, such as a servo actuator. The RWA 20 receives an electronic communication signal of rotation of the steering wheel by the operator. An operator controls the steering wheel to directionally control the vehicle 100. The angle from HWA 10 is sent to the RWA 20 which performs position control to control rack travel to guide the roadwheel. However, due to the lack of mechanical connection between the steering wheel and the road wheels, the operator is not provided with a feel for the road without torque feedback (unlike the case in an EPS as described earlier).

In one or more examples, the HWA 10 that is coupled to the steering column and steering wheel simulates the operator's feel of the road. The HWA 10 may apply tactile feedback in the form of torque to the steering wheel. The HWA 10 receives a rack force signal from the RWA 20 to generate an appropriate torque feel for the operator. Alternatively, the handwheel angle and vehicle speed can also be used to generate desired torque feel to the operator.

In a steering system that has a mechanical linkage between the handwheel and the roadwheel, one or more gears and other mechanical components maintain the handwheel and the roadwheel synchronized. That is, whenever the handwheel is moved the roadwheel moves according to the mechanical linkage. However, in case of the SbW system 40, where such a mechanical linkage does not exist, the handwheel and the roadwheel can get out of synchronization. For example, if the handwheel is moved when the SbW system 40 is switched off (vehicle is off, SbW disconnected from battery etc.), and/or if the handwheel is pushed past an end-of-travel limit, the handwheel position is not in synchronization with that of the roadwheel. Alternatively still, in case of an autonomous drive enabled vehicle, during autonomous drive, the handwheel may not change position as the autonomous drive system controls the roadwheel to maneuver the vehicle; thus, the handwheel and the roadwheel can be out of synchronization.

Such out of synchronization situations are a technical challenge because the SbW system 40 in an attempt to resynchronize the roadwheel and the handwheel can make a substantially fast maneuver that can cause a jolt to the operator. Alternatively, or in addition, the roadwheel may change position to synchronize with that of the handwheel causing the operator to experience a 'self-steer' situation where the vehicle maneuvers without any input from the operator.

For example, when the handwheel is out of sync with the roadwheel, the rack position reference commanded from handwheel position with the prescribed steering ratio can be very far from where the actual rack position is. The HWA 10 and the RWA 20 typically have a 'steering ratio' that determines how much the roadwheel changes position when a corresponding change in position is made in the handwheel of the SbW system 40. The steering ratio is a predetermined value. Accordingly, if the RWA 20 uses the steering ratio, and such rack position reference is applied directly, a very fast uncontrolled sync up takes place as the RWA 20 attempts to bring the rack position to its reference rack position. The reference rack position is calculated by the RWA 20 based on the handwheel position. This has two negative impacts to the control of the vehicle. First the operator can experience a sudden and very uncomfortable jolt because the RWA 20 is typically tuned to provide fast rack position tracking. Second, the vehicle self-steers in this process since the handwheel does not move but the rack moves on its own.

On the other hand, the out of sync cannot be left permanent because it can cause confusion to the operator.

The technical solutions described herein address such technical challenges and provide a resynchronization technique for the handwheel and the roadwheel in case of SbW systems 40. The technical solutions described herein provide the resynchronization while maintaining vehicle heading control at all times, which requires turning roadwheel in the same direction as handwheel.

Using the technical solutions described herein the roadwheel does not move when the handwheel does not move, i.e. no resynchronization to be performed when operator does not steer. In addition, when the operator does steer, that is moves the handwheel, the resynchronization is done in a way that it effectively changes a steering factor which is amount of rack travel in mm per each handwheel revolution ("c" factor), which blends into the steering action.

The steering system 40 can include a resynchronization module 200 that implements the technical solutions described herein by adjusting the handwheel position that is used by the RWA 20 to calculate the rack position reference. It should be noted that while FIG. 1 depicts the resynchronization module 200 as a separate block, in one or more examples, the resynchronization module 200 is part of the controllers 14/22 of the HWA 10 and/or RWA 20. The resynchronization module 200 can include one or more electronic circuits. In one or more examples, the resynchronization module 200 includes a memory device that has one or more computer executable instructions stored therein.

Figure 2A:
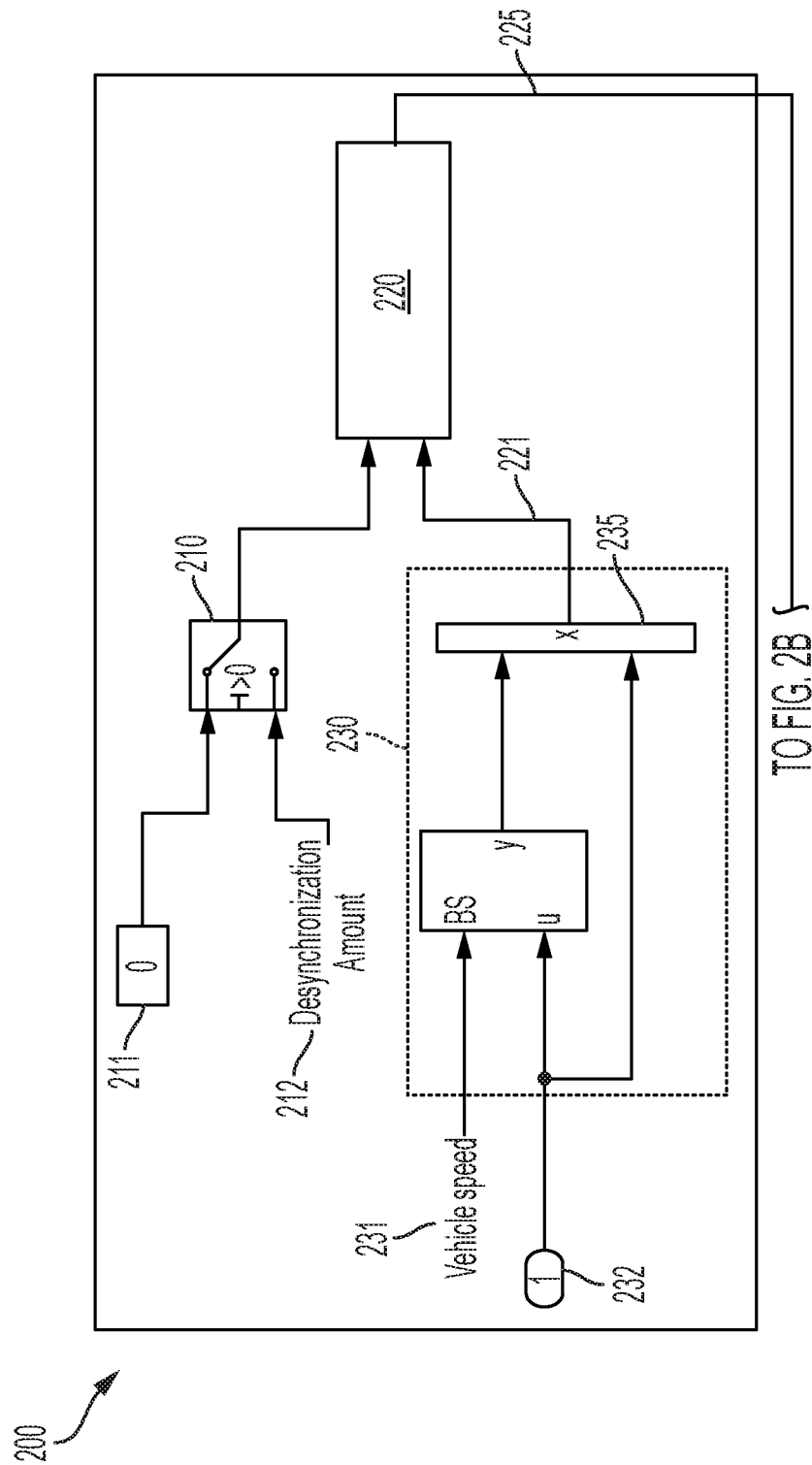

FIGS. 2A and 2B depict a block diagram of the resynchronization module according to one or more embodiments. The resynchronization module 200 calculates an amount of handwheel angle adjustment 225, which is added to the actual handwheel position to become the handwheel position used to generate the rack position reference. The amount of adjustment 225 is a function of three variables: amount of desynchronization 212, vehicle speed 231, and handwheel velocity 232.

The resynchronization module 200 includes a switch 210, which turns on when resynchronization is requested because of occurrence of an event. Two examples of such an event are 1) transition from autonomous driving to human driving; 2) engine ignition being turned on. It is understood that other events can also trigger the resynchronization. The desynchronization amount 212 is the difference between the synced handwheel position and the current handwheel position where the synced handwheel position is calculated from rack position by passing it through an inverse c factor lookup.

Figure 2C:
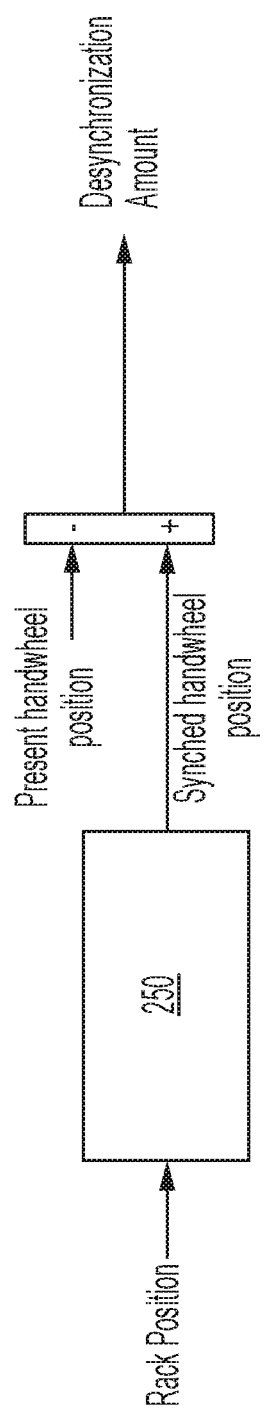
FIG. 2C depicts a block diagram of a module for computing an inverse "c factor" according to one or more embodiments.

FIG. 2C depicts a block diagram of a module for computing an inverse "c factor" according to one or more embodiments. The rack position is used as an input and a corresponding handwheel position is calculated by rack position to handwheel position calculator 250. A difference between the calculated handwheel position and a measured handwheel position (actual handwheel position) is computed (255) as the desynchronization amount 212.

Referring to FIGS. 2A and 2B, the amount of adjustment 225 is initially equal to the amount of desynchronization 212 and as the amount of adjustment 225 decreases the amount of desynchronization 212 reduces. When the amount of adjustment 225 substantially matches a predetermined value 211, for example zero, the SbW 40 system is resynchronized (synced up). After the system is resynchronized, the output 225 of the resynchronization module 200 is substantially equal to zero (predetermined value 211) until the resynchronization module 200 is switched off and on again; at which point, the resynchronization module 200 restarts and recalculates a new amount of adjustment 225, depending on the inputs as described above. Examples of an event that turns off the resynchronization module 200 include 1) switching from human driving to autonomous driving; and 2) ignition turning off, etc. It is understood that various other events can trigger the switch off.

The resynchronization calculation 220 receives the output of the switch 210 and a calculated slew rate 221 output by a slew rate limiter 230. The handwheel velocity-based slew rate limiter 230 controls the rate of synchronization by the resynchronization calculator 220. The slew rate limiter 230 receives the vehicle speed 231 and the handwheel velocity 232. The slew rate limiter 230 facilitates that if the handwheel velocity 232 is zero, i.e. if the operator holds the handwheel steady, no change in rack position reference is affected because of the handwheel velocity 232 being used to multiply (235) the slew rate 221. Accordingly, no resynchronization is performed when the handwheel velocity 232 is zero, that is when the handwheel is stationary. This prevents self-steering. When the operator starts steering, the rack position reference is then a function of two variables: the current handwheel position 241 as well as the handwheel adjustment 225, in addition to the vehicle speed 231.

The current handwheel position 241 and the handwheel adjustment 225 are added (242). The resulting adjusted handwheel position 243 and the vehicle speed 231 are used by the reference rack position calculator 240 to compute the reference rack position 245.

In one or more examples, the resynchronization module 200 uses a three-dimensional look up in one or more tables such as a speed vector, a handwheel velocity vector, and c factor change lookup table. For example, the slew rate limiter 230 uses the vehicle speed 231 and the handwheel velocity 232 to look up the output slew rate 221. Further, the reference rack position calculator 240 determines the reference rack position 245 based on a look up table using the vehicle speed 231 and the handwheel position, in this case the adjusted handwheel position 243 being used.

Figure 3:
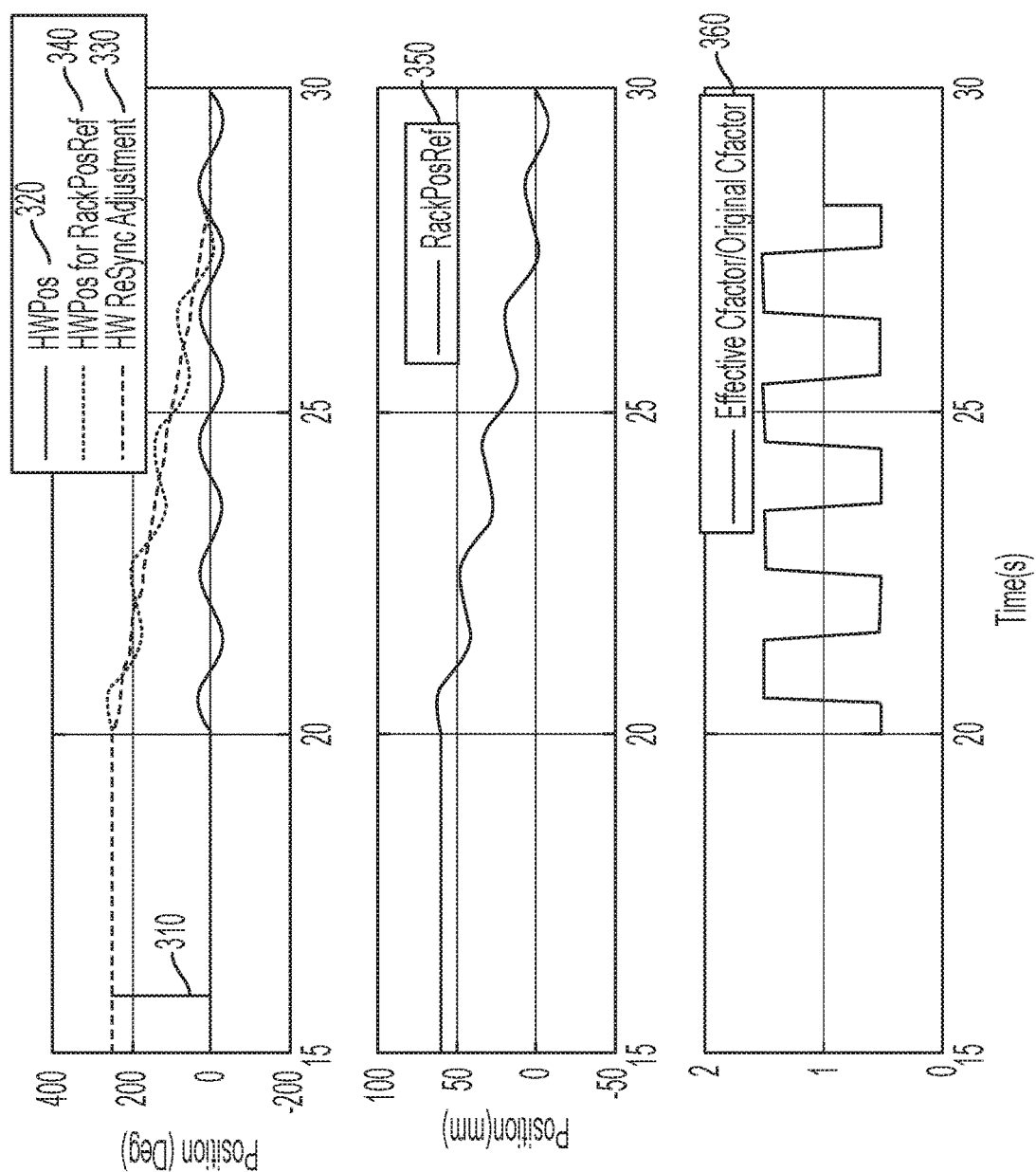
FIG. 3 shows a simulation result in an exemplary scenario according to one or more embodiments.

FIG. 3 shows a simulation result in an exemplary scenario according to one or more embodiments. It is understood that the scenario described and the particular graphs, timings, and other such values provided herein are exemplary and just one possible case among several others that are possible with regard to the technical solutions described herein. In the example scenario depicted, the SbW system 40 is out of sync (310) where initially handwheel is at the center but the rack is out of sync at over 200 pinion degrees. Further, in the example scenario, before t=20 seconds, the operator holds the handwheel stationary, hence there is no resynchronization. After t=20 seconds, the operator provides a 30-degree amplitude 0.5 Hz sine wave (320) to the handwheel, which activates the resynchronization calculation 220. It takes about 8 seconds for the SbW system 40 to resynchronize. The handwheel position (320) is adjusted by an adjustment amount (330) that is determined as described herein, which results in the adjusted handwheel position (340). As shown the reference rack position (350) computed using the adjusted handwheel position (340) moves in the same direction as the handwheel (320). Typically, the rack position follows the rack reference position closely.

Figure 4:
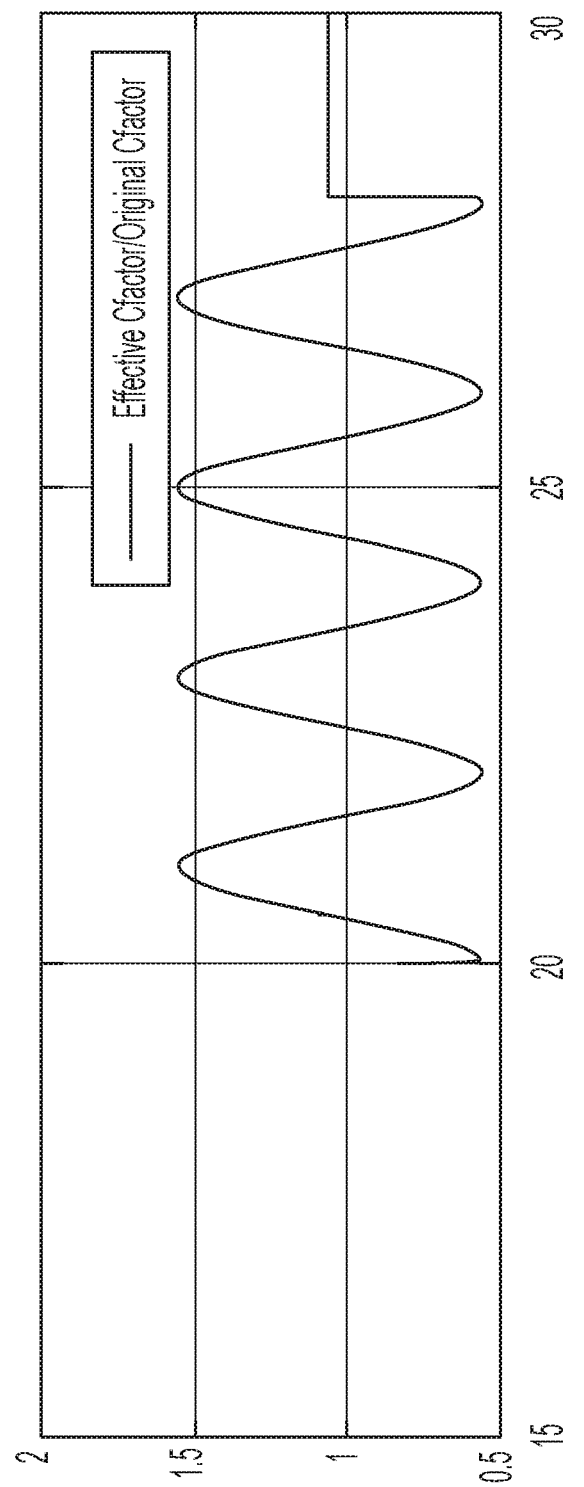
FIG. 4 depicts a smoothed c factor graph according to one or more embodiments.

The resynchronization logic in 200 is implemented outside the c factor logic in 240. This separation allows the resynchronization logic to be implemented to work with various c factor logic implementation. Furthermore, that in spite of the logic separation the resynchronization logic effectively changes the c factor which allows the resynchronization to blend smoothly into driver's action. The bottom graph (360) shows that the resynchronization module 200 changes the c factor by a calibrate-able 50% during the resynchronization process in this example scenario. Specifically, the c factor is reduced by 50% as handwheel moves toward roadwheel and increased by 50% as handwheel moves away from roadwheel. In one or more examples, the resynchronization module 200 can be calibrated to generate a smooth c factor change, as shown in FIG. 4. For example, a smoothing filter can be used, such as a moving average, or any other such computation.

Figure 5:
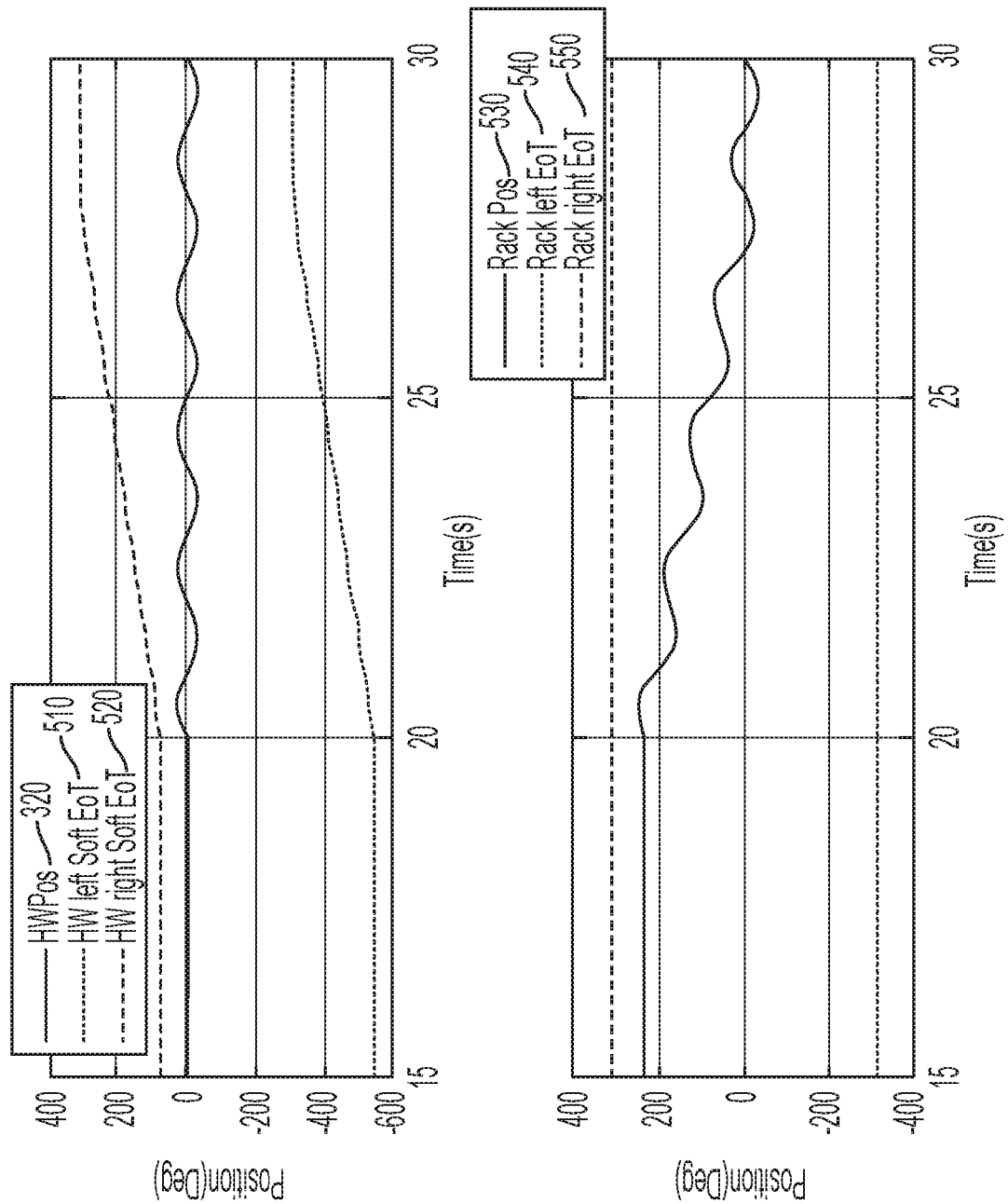
FIG. 5 depicts a graph depicting adjustments to end of travel positions according to one or more embodiments.

Further, the handwheel adjustment 225 is also used to adjust the handwheel soft end of travel position. As is shown in FIG. 5, both left (510) and right (520) soft end of travel position is modified by the handwheel adjustment 225 to accurately communicate the rack end of travel position back to handwheel. FIG. 5 also shows, as handwheel and roadwheel synchronize, the soft end of travel positions (510, 520) gradually goes back to its normal position. As depicted the left and right end of travel positions (540, 550) of the rack stay steady, which are typically physical limits for the rack position (530).

Figure 6:
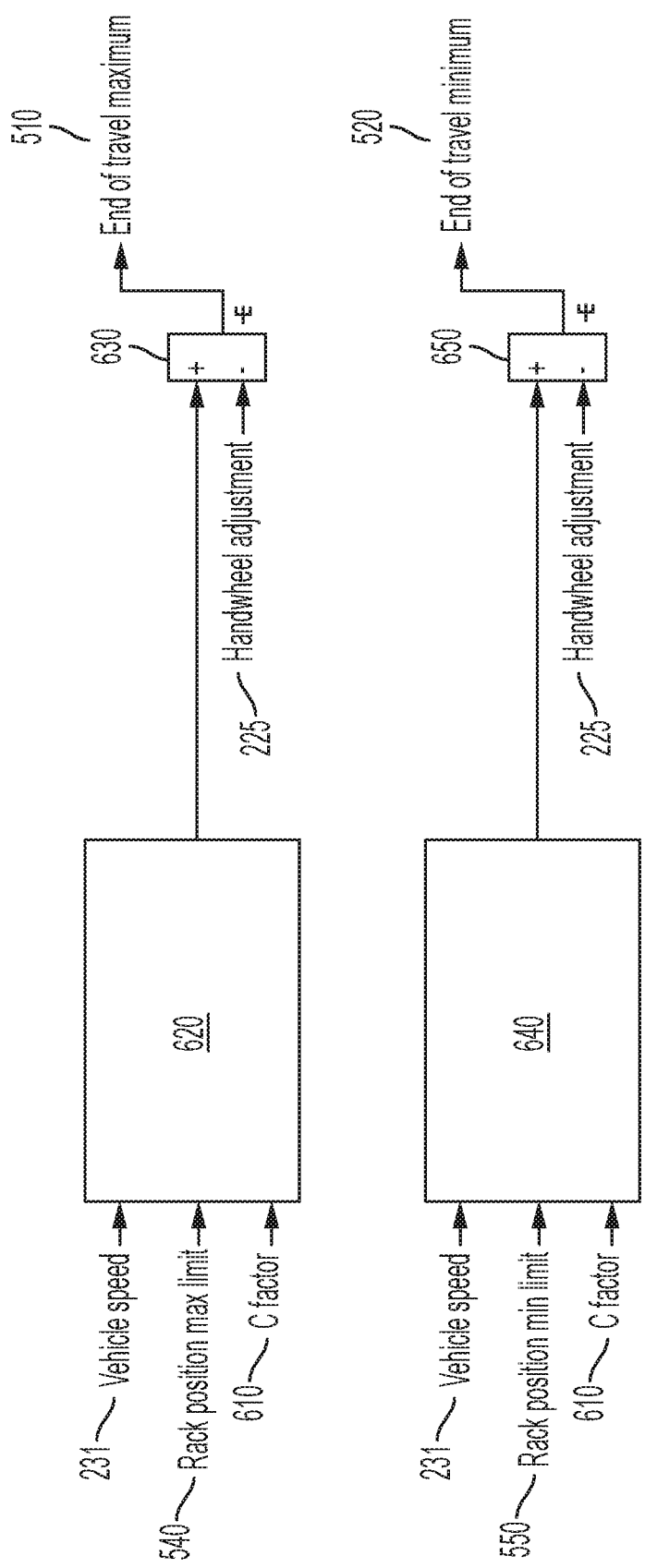
FIG. 6 depicts a block diagram for computing end of travel positions for the handwheel according to one or more embodiments.

FIG. 6 depicts a block diagram for computing end of travel positions for the handwheel according to one or more embodiments. The rack position maximum limit 540, which can be the extreme left position for the rack, is converted (620) to the left end of travel (510) of the handwheel. For example, the vehicle speed 231 and the c factor 610 is used to compute left end of travel (510) of the handwheel. This conversion is performed using the typical computation used by the HWA 10 to convert a rack position into a handwheel position. In addition, the computed left end of travel is adjusted by adding (630) the handwheel adjustment 225 to obtain the left end of travel (510).

Similarly, the rack position minimum limit 550, which can be the extreme right position of the rack, is converted (640) to the right end of travel (520) of the handwheel using the vehicle speed 231 and the c factor 610. The conversion is performed using the typical rack position to handwheel position conversion used by the HWA 10. The converted value is further adjusted by adding (650) the handwheel adjustment 225 to obtain the right end of travel (520).

It is understood that the 'maximum', 'minimum', 'right', and 'left' values in the above description can be interchanged in other example implementations of the technical solutions described herein.

The end of travel (510, 520) positions are used to provide notifications to the operator if s/he actuates the handwheel beyond those positions. The notification can be a haptic torque at the handwheel, or any other component (such as the seat). Alternatively, or in addition, the notification can include an audio/visual notification, such as via the sound system, the driver information console, and the like.

The technical solutions described herein accordingly facilitate a SbW system to dynamically adjust the c factor that is used by the HWA and the RWA to adjust the positions of the handwheel and rack to synchronize with each other. The rate of adjusting can be further adjusted based on parameters such as vehicle speed, handwheel speed. The technical solutions improve the operation of the steering system by preventing the steering system from continuing to try and achieve a desired position after the operator ceases to actuate the handwheel. If the steering system is not prevented, it can cause a lag in the vehicle response and can make it appear that the vehicle has continued to steer on its own. In addition, a sudden jolt to the handwheel is also prevented.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

Having thus described the invention, it is claimed:

1. A steer by wire steering system comprising:
   a handwheel actuator; a
   roadwheel actuator; and
   a resynchronization module to dynamically adjust handwheel position that is used for rack position reference calculation, the dynamic adjustment comprising:
      determining a desynchronization amount based on a difference in an actual handwheel position and a synchronized handwheel position;
      receiving, from a slew rate limiter, a slew rate determined based on a vehicle speed and a handwheel speed;
      computing a handwheel adjustment using the desynchronization amount and the slew rate;
      computing an adjusted handwheel position based on the handwheel adjustment and the actual handwheel position;
      updating the reference rack position based on the adjusted handwheel position; and
      repeating the dynamic adjustment responsive to the handwheel adjustment being greater than zero.

2. The steer by wire steering system of claim 1, wherein computing the adjusted handwheel position comprises:
   adding the handwheel position and the handwheel adjustment.

3. The steer by wire steering system of claim 1,
   wherein the resynchronization module is further configured to limit the handwheel adjustment based on the slew rate.

4. The steer by wire steering system of claim 1, wherein, the resynchronization module is further configured to adjust an end of travel position for the handwheel using the handwheel adjustment.

5. The steer by wire steering system of claim 4, wherein adjusting the end of travel position comprises:
   computing a first end of travel position based on a corresponding rack position limit; and
   adding the handwheel adjustment into the first end of travel position to compute the end of travel position.

6. The steer by wire steering system of claim 4, wherein the end of travel position is one of a left end of travel position and a right end of travel position.

7. The steer by wire steering system of claim 4, wherein a notification is generated in response to the handwheel position exceeding the end of travel position.

8. A method for synchronizing a handwheel and a roadwheel in a steer by wire steering system, the method comprising:
   dynamically adjust handwheel position that is used for rack position reference calculation, the dynamic adjustment comprising:
      determining a desynchronization amount based on a difference in an actual handwheel position and a synchronized handwheel position;
      receiving, from a slew rate limiter, a slew rate determined based on a vehicle speed and a handwheel speed;
      computing a handwheel adjustment using the desynchronization amount and the slew rate;
      computing an adjusted handwheel position based on the handwheel adjustment and the actual handwheel position;
      updating the reference rack position based on the adjusted handwheel position; and
      repeating the dynamic adjustment responsive to the handwheel adjustment being greater than zero.

9. The method of claim 8, wherein computing the adjusted handwheel position comprises:
   adding the handwheel position and the handwheel adjustment.

10. The method of claim 8, further comprising, limiting the handwheel adjustment based on the slew rate.

11. The method of claim 8, further comprising, adjusting an end of travel position for the handwheel using the handwheel adjustment.

12. The method of claim 11, wherein adjusting the end of travel position comprises:
- computing a first end of travel position based on a corresponding rack position limit; and
- adding the handwheel adjustment into the first end of travel position to compute the end of travel position.

13. The method of claim 11, wherein the end of travel position is one of a left end of travel position and a right end of travel position.

14. The method of claim 11, further comprising, generating a notification in response to the handwheel position exceeding the end of travel position.

15. A computer program product comprising a memory storage device having computer executable instructions stored therein, the computer executable instructions when executed by a processing unit cause the processing unit to perform resynchronization of a handwheel and a roadwheel in a steer by wire steering system, the resynchronization comprising:
- dynamically adjust handwheel position that is used for rack position reference calculation, the dynamic adjustment comprising:
  - determining a desynchronization amount based on a difference in an actual handwheel position and a synchronized handwheel position;
  - receiving, from a slew rate limiter, a slew rate determined based on a vehicle speed and a handwheel speed;
  - computing a handwheel adjustment using the desynchronization amount and the slew rate;
  - computing an adjusted handwheel position based on the handwheel adjustment and the actual handwheel position;
  - updating the reference rack position based on the adjusted handwheel position; and
  - repeating the dynamic adjustment responsive to the handwheel adjustment being greater than zero.

16. The computer program product of claim 15, wherein computing the adjusted handwheel position comprises:
- adding the handwheel position and the handwheel adjustment.

17. The computer program product of claim 15, wherein the resynchronization further comprises:
- limiting the handwheel adjustment based on the slew rate.

18. The computer program product of claim 15, wherein, the resynchronization further comprises:
- adjusting an end of travel position for the handwheel using the handwheel adjustment.

19. The computer program product of claim 18, wherein adjusting the end of travel position comprises:
- computing a first end of travel position based on a corresponding rack position limit; and
- adding the handwheel adjustment into the first end of travel position to compute the end of travel position.

20. The computer program product of claim 18, wherein the end of travel position is one of a left end of travel position and a right end of travel position.

* * * * *